(12) United States Patent
Nath et al.

(10) Patent No.: US 12,091,946 B2
(45) Date of Patent: Sep. 17, 2024

(54) SYSTEM AND METHODOLOGY INCLUDING STRAIN FILTER IN DOWNHOLE PUMPS

(71) Applicant: LUFKIN LIFT SOLUTIONS, LLC., Missouri City, TX (US)

(72) Inventors: Chinmoy Nath, Midland, TX (US); Christopher Valenzuela, Midland, TX (US)

(73) Assignee: LUFKIN LIFT SOLUTIONS, LLC

( * ) Notice: Subject to any disclaimer, the term of this patent is extended or adjusted under 35 U.S.C. 154(b) by 885 days.

(21) Appl. No.: 16/965,159

(22) PCT Filed: Jan. 28, 2019

(86) PCT No.: PCT/US2019/015373
§ 371 (c)(1),
(2) Date: Jul. 27, 2020

(87) PCT Pub. No.: WO2019/148078
PCT Pub. Date: Aug. 1, 2019

(65) Prior Publication Data
US 2021/0222524 A1   Jul. 22, 2021

Related U.S. Application Data

(60) Provisional application No. 62/623,366, filed on Jan. 29, 2018.

(51) Int. Cl.
*E21B 43/12* (2006.01)
*B01D 35/02* (2006.01)
*E21B 43/08* (2006.01)

(52) U.S. Cl.
CPC ............ *E21B 43/086* (2013.01); *B01D 35/02* (2013.01); *E21B 43/121* (2013.01);
(Continued)

(58) Field of Classification Search
CPC ...... E21B 43/127; E21B 43/121; E21B 43/38; E21B 43/086; B01D 35/02; B01D 29/33
See application file for complete search history.

(56) References Cited

U.S. PATENT DOCUMENTS

| | | | | |
|---|---|---|---|---|
| 2,501,237 A | * | 3/1950 | Sanders | E21B 37/00 417/450 |
| 4,231,767 A | * | 11/1980 | Acker | E21B 43/38 96/174 |

(Continued)

FOREIGN PATENT DOCUMENTS

| | | |
|---|---|---|
| RU | 154005 U1 | 8/2015 |
| WO | 2015171333 A1 | 11/2015 |

OTHER PUBLICATIONS

International Search Report and Written Opinion issued in the PCT Application PCT/US2019/015373, dated May 1, 2019 (13 pages).

(Continued)

*Primary Examiner* — Kenneth L Thompson
(74) *Attorney, Agent, or Firm* — DENTONS Cohen & Grigsby P.C.

(57) ABSTRACT

A technique facilitates filtration of solids from a well fluid to during a pumping operation. The system may comprise a downhole pump, e.g. a downhole rod lift pump, having a pump housing through which a well fluid is moved during pumping of the well fluid. The pump housing is configured to receive a filter assembly which filters solids from the well fluid during pumping. The filter assembly may comprise a strainer having a filter section and a strainer bushing affixed to the filter section. The filter section may have a plurality of filter holes sized to aid in the filtration of solids. The filter assembly also may comprise a mechanical hold down having an interior sized to receive the filter section. An external bushing is secured to the mechanical hold down in a manner (Continued)

which holds the filter section within the mechanical hold down.

17 Claims, 5 Drawing Sheets

(52) U.S. Cl.
CPC ........ *E21B 43/127* (2013.01); *B01D 2201/02* (2013.01); *B01D 2201/4084* (2013.01)

(56) References Cited

U.S. PATENT DOCUMENTS

| | | | | |
|---|---|---|---|---|
| 5,553,669 | A * | 9/1996 | Trainer | B01D 29/48 |
| | | | | 166/105.1 |
| 7,909,092 | B2 * | 3/2011 | Cobb | E21B 43/35 |
| | | | | 166/227 |
| 8,950,491 | B2 * | 2/2015 | Frost | E21B 37/06 |
| | | | | 166/310 |
| 9,421,484 | B2 * | 8/2016 | Ford | E21B 17/1071 |
| 9,771,786 | B2 * | 9/2017 | Raglin | E21B 43/35 |
| 10,385,663 | B2 * | 8/2019 | Lane | E21B 43/126 |
| 10,731,446 | B2 * | 8/2020 | Stachowiak | F04B 53/14 |
| 10,883,354 | B2 * | 1/2021 | Watson | E21B 43/38 |
| 2004/0079551 | A1 | 4/2004 | Herst | |
| 2010/0236833 | A1 | 9/2010 | Hall et al. | |
| 2013/0327528 | A1 * | 12/2013 | Frost | E21B 37/06 |
| | | | | 166/310 |
| 2015/0047830 | A1 | 2/2015 | Morton et al. | |
| 2017/0089154 | A1 | 3/2017 | Cantrell et al. | |

OTHER PUBLICATIONS

American Petroleum Institute, Specification for Subsurface Sucker Rod Pump Assemblies, Components, and Fittings, API Specification 11AX, 13th Edition, May 2015, p. 79.

* cited by examiner

SYSTEM AND METHODOLOGY INCLUDING STRAIN FILTER IN DOWNHOLE PUMPS

CROSS-REFERENCE TO RELATED APPLICATION

The present document is based on and claims priority to U.S. Provisional Application Ser. No. 62/623,366, filed Jan. 29, 2018, which is incorporated herein by reference in its entirety.

BACKGROUND

Downhole rod lift pumps are used in a variety of well applications to pump well fluids to a surface collection location. The downhole rod lift pumps have a strainer which strains the inflowing well fluids to prevent downhole solids from flowing into the pump. Various existing strainers have a washer welded to a perforated gauge plate and this assembly is secured within the pump. Often, however, such an assembly may be poorly mated with corresponding pump components and thus susceptible to fracture or other damage.

SUMMARY

In general, a system and methodology are provided for use in a well to filter solids during a pumping operation. The system may comprise a downhole pump, e.g. a downhole rod lift pump, having a pump housing through which a well fluid is moved during pumping of the well fluid. The pump housing is configured to receive a filter assembly which filters solids from the well fluid during pumping. The filter assembly may comprise a strainer having a filter section and a strainer bushing affixed to the filter section. The filter section may have a plurality of filter holes sized to aid in the filtration of solids. The filter assembly also may comprise a mechanical hold down having an interior sized to receive the filter section. An external bushing is secured to the mechanical hold down in a manner which holds the filter section within the mechanical hold down.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

The disclosure herein generally involves a system and methodology to facilitate filtration of solids with respect to well fluid during a pumping operation. The system may comprise a downhole pump, e.g. a downhole rod lift pump, having a pump housing through which a well fluid is moved during pumping of the well fluid. The pump housing is configured to receive a filter assembly which filters solids from the well fluid during pumping.

The filter assembly may comprise a strainer having a filter section and a strainer bushing affixed to the filter section. The filter section may have a plurality of filter holes sized to aid in the filtration of solids. In some embodiments, the filter section is generally conical in shape and the filter holes are arranged to filter fluid as it flows from an exterior to an interior of the conical filter section. The filter assembly also may comprise a mechanical hold down having an interior sized to receive the filter section. An external bushing is secured to the mechanical hold down in a manner which holds the filter section within the mechanical hold down.

The filter assembly may be used in downhole rod lift pumps and in various other types of downhole pumps or pumps used in other types of environments and applications. In general, the filter assembly uses a strainer to prevent downhole solids from flowing into the pump during pumping of fluid, e.g. well fluid. The filter assembly positions the strainer in a mechanical hold down and is able to entrap or block solids to ensure the efficiency of the pump is not compromised by the solids.

An advantage of the filter assembly is derived from the position and location at which it is installed. As explained in greater detail below, the strainer has a filter section combined with a bushing, e.g. a machined bushing. The filter section is disposed within the mechanical hold down and the bushing is secured within the mechanical hold down. In this manner, the strainer is secured, protected, and kept from interfering with outside mating components without restricting flow into the pump and without risk of poorly mated components.

Figure 1:
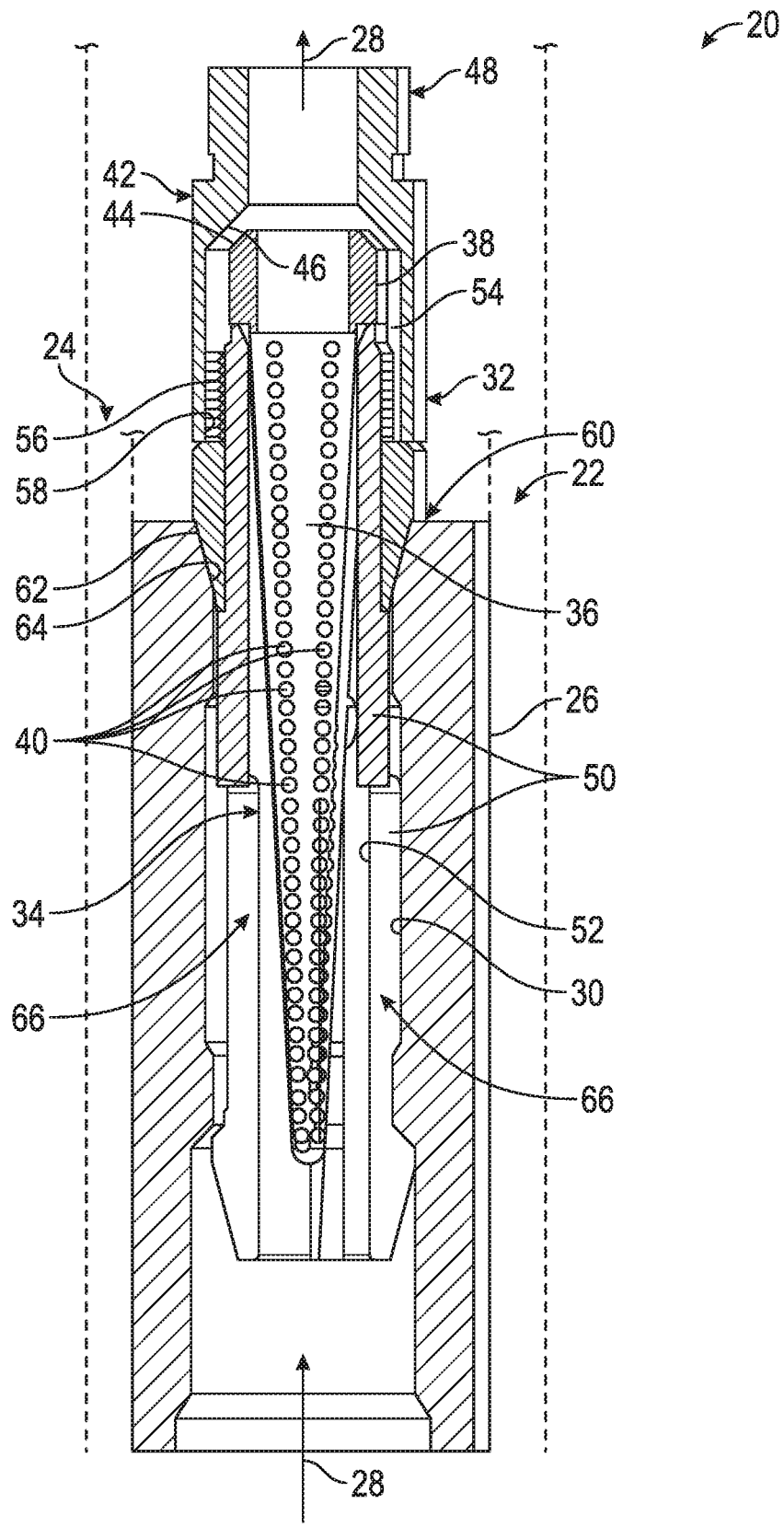
FIG. 1 is an illustration of an example of a filter assembly positioned in a pump housing of a downhole pump, such as a downhole rod lift pump, according to an embodiment of the disclosure.

Referring generally to FIG. 1, an example of a pumping system 20 is illustrated as comprising a pump 22 deployed downhole for use in a well, e.g. in a wellbore 24. By way of example, the pump 22 is in the form of a downhole rod lift pump although other types of pumps may be used. In the example illustrated, the pump 22 comprises a pump housing 26, e.g. a seat nipple, through which a well fluid is moved during pumping of the well fluid, as indicated by arrows 28. The pump housing/seat nipple 26 is configured with a hollow interior 30 sized to receive a hold down filter assembly 32. For a variety of pumping applications, the rod lift pump 22 is conveyed downhole into a borehole, e.g. wellbore 24, and the rod lift pump 22 is operated to pump the well fluid 28 to a suitable surface collection location.

Figure 2:
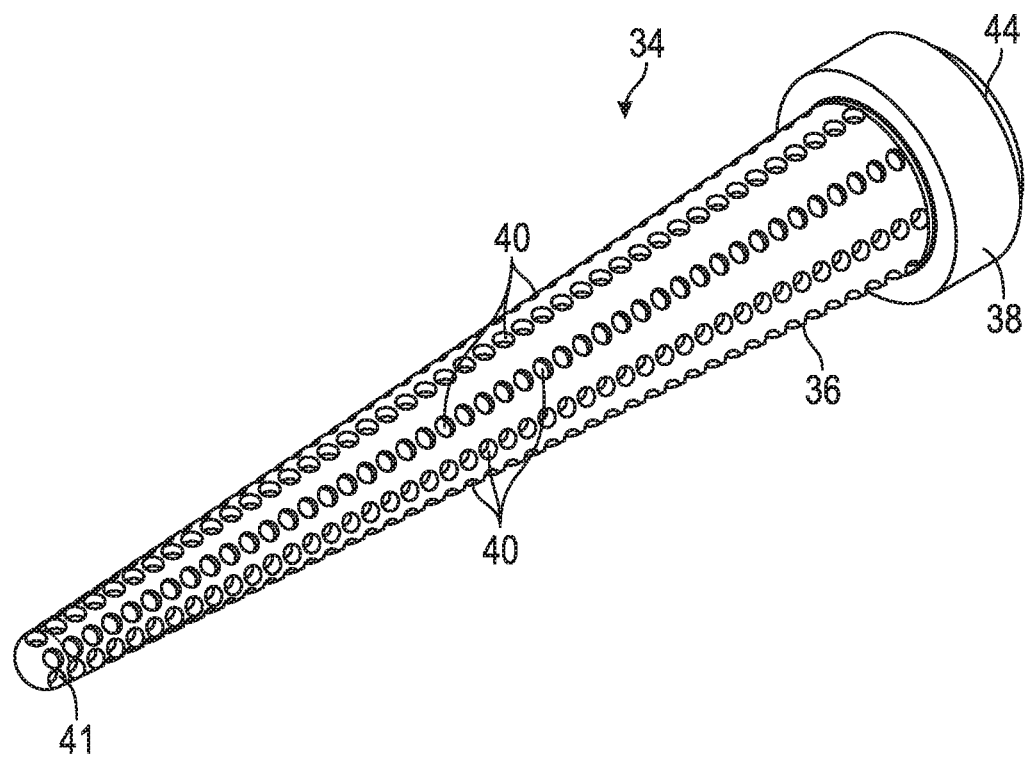
FIG. 2 is an illustration of an example of a strainer which may be used in the filter assembly, according to an embodiment of the disclosure.

In the illustrated embodiment, the hold down filter assembly 32 comprises a strainer 34 having a filter section 36 and a strainer bushing 38, as further illustrated in FIG. 2. By way of example, the strainer bushing 38 may be welded to an end of filter section 36 or attached thereto by other suitable connector or connection technique. The filter section 36 may comprise a plurality of filter openings 40, e.g. filter holes, sized to aid in filtration of solids.

In some embodiments, the filter section 36 may be conical in shape. The conical shape may be oriented such that the filter section 36 continually tapers to a smaller external diameter until reaching the smallest diameter at a bottom 41 of the filter section 36. According to one example, the filter section 36 may be constructed from a sheet material formed in a generally conical shape with the filter openings 40 arranged to filter fluid as it flows from an exterior to an interior of the conically shaped filter section 36.

Figure 3:
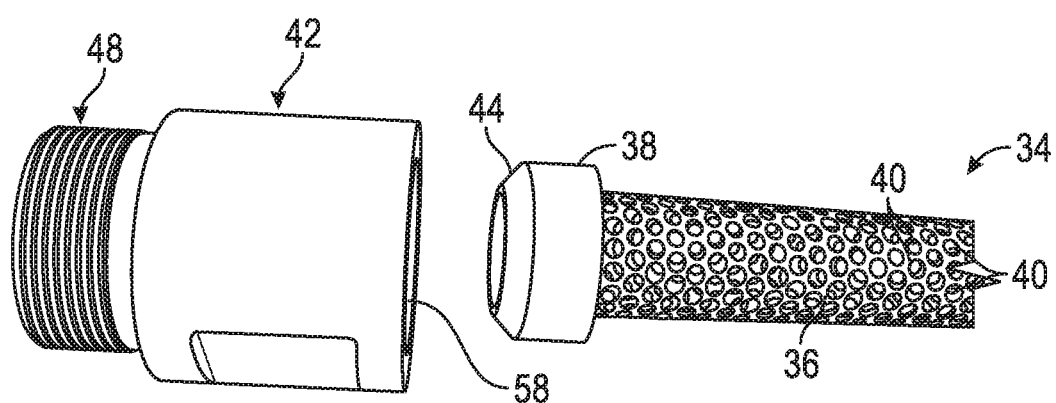
FIG. 3 is an illustration of an example of a strainer and a corresponding external bushing, according to an embodiment of the disclosure.

With additional reference to FIG. 3, the hold down filter assembly 32 also may comprise an external bushing 42 having an interior sized to receive the strainer bushing 38. By way of example, the strainer bushing 38 may have a tapered surface 44 oriented for sealing engagement with a corresponding internal surface 46 of external bushing 42 (see FIG. 1). In some embodiments, the external bushing 42 also may comprise a threaded top end 48 which may be used to help secure the filter assembly 32 into pump 22. For example, the threaded top end 48 may be used to secure the filter assembly 32 into a cage section of a downhole rod lift pump.

Figure 4:
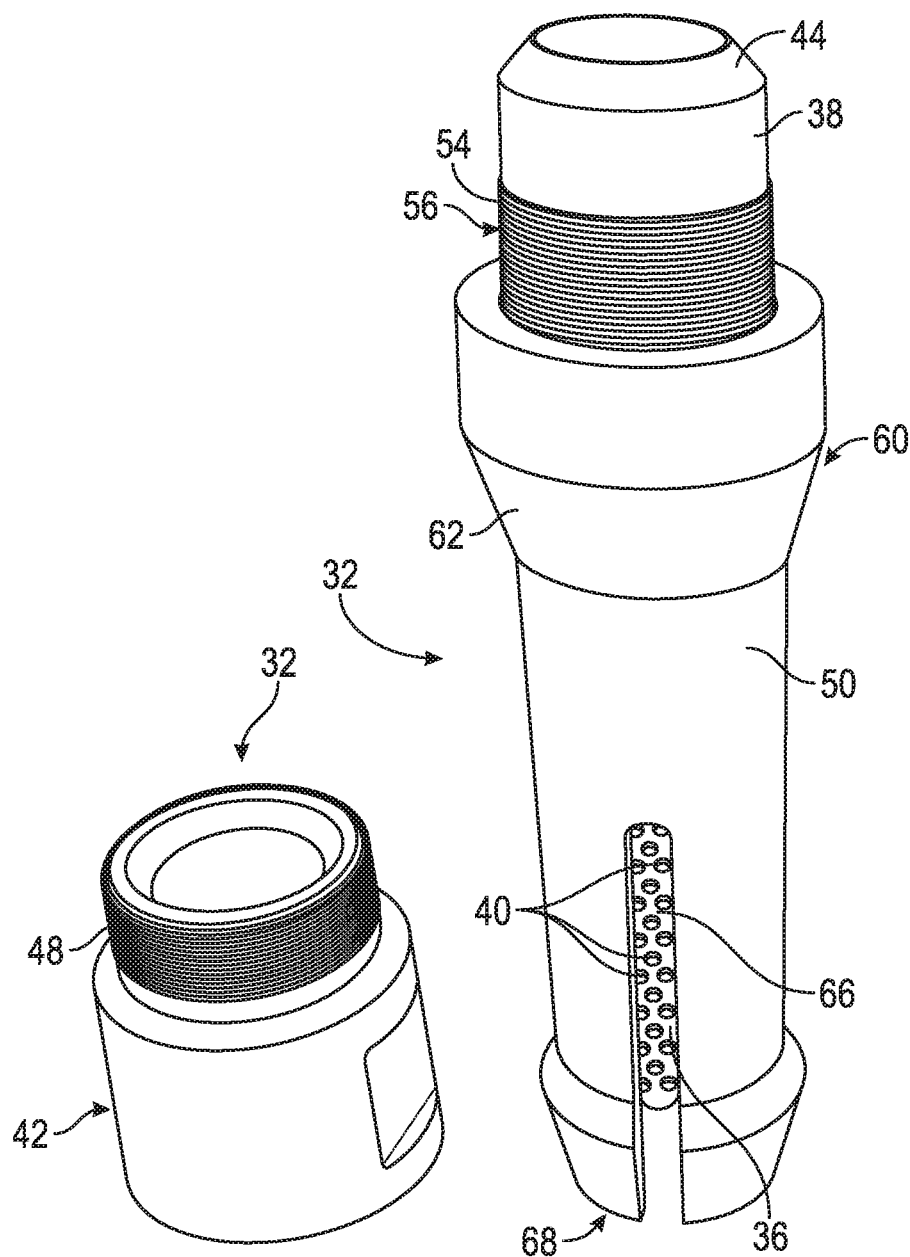
FIG. 4 is an illustration of an example of a filter assembly in which the strainer has been inserted into a mechanical hold down and prior to attaching the external bushing, according to an embodiment of the disclosure.
Figure 5:
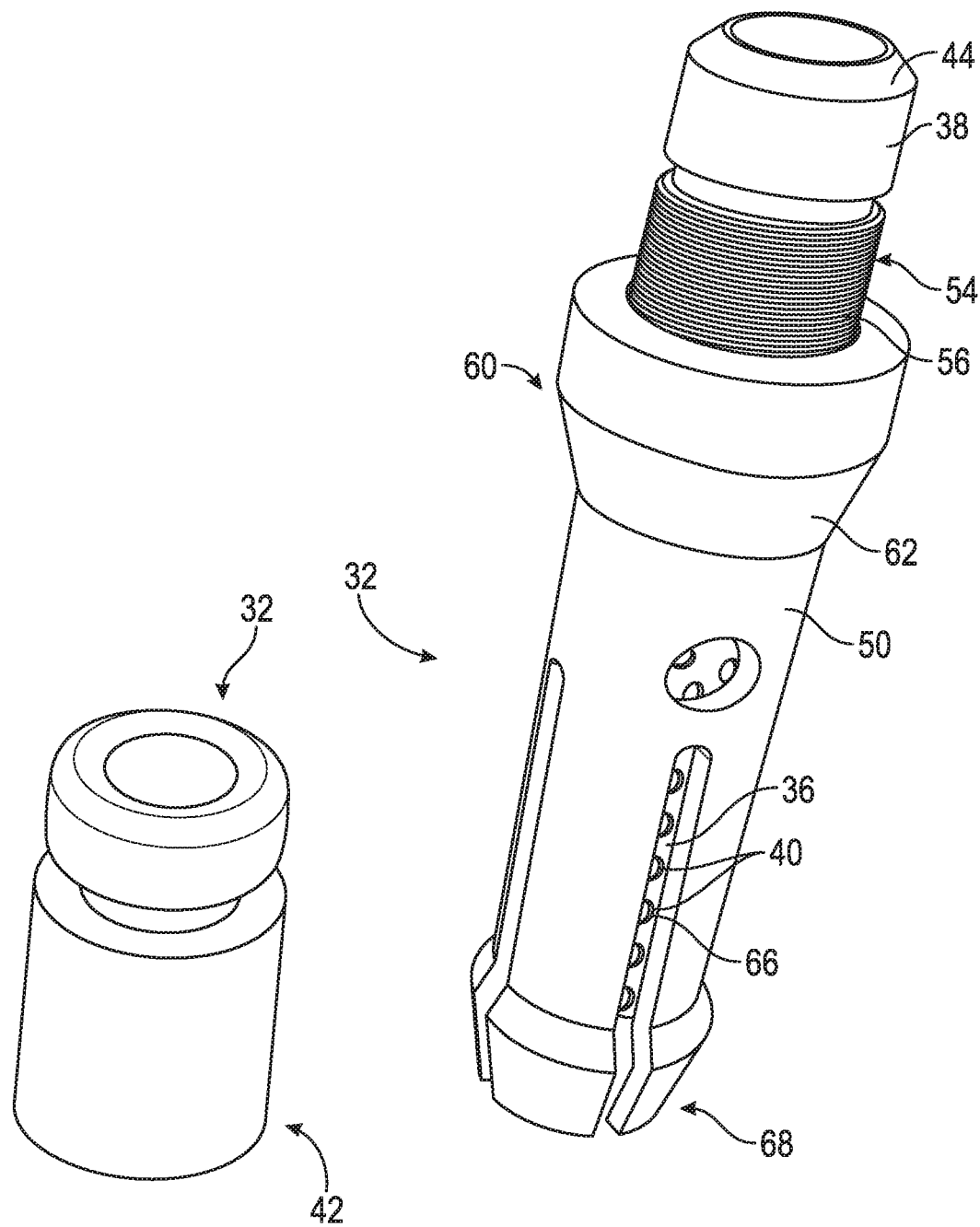
FIG. 5 is an illustration of another example of a filter assembly in which the strainer has been inserted into a mechanical hold down and prior to attaching the external bushing, according to an embodiment of the disclosure.

Referring also to the embodiments illustrated in FIGS. 4 and 5, each embodiment of filter assembly 32 may further comprise a mechanical hold down 50 which has an interior 52 sized to receive the filter section 36 of strainer 34 (see also FIG. 1). The mechanical hold down 50 may have a top end 54 sized such that strainer bushing 38 rests against the top end 54 when the filter section 36 is inserted into interior 52. It should be noted FIGS. 4 and 5 illustrate two slightly different embodiments of the filter assembly 32. However, other sizes and configurations of filter assembly 32 may be constructed to suit parameters of a given pumping application.

Figure 6:
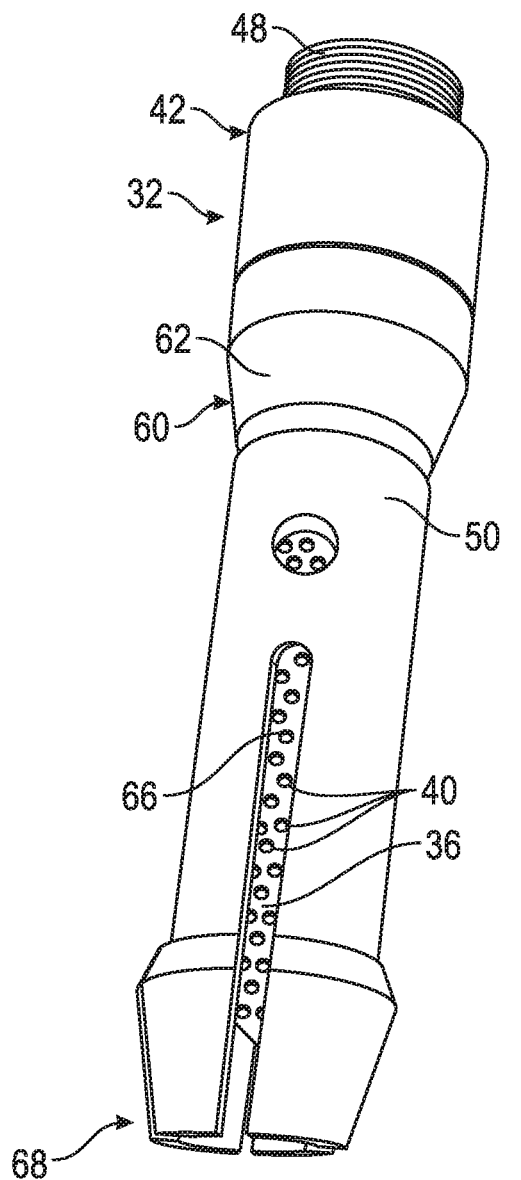
FIG. 6 is an illustration of the filter assembly of FIG. 4 but in assembled form, according to an embodiment of the disclosure.
Figure 7:
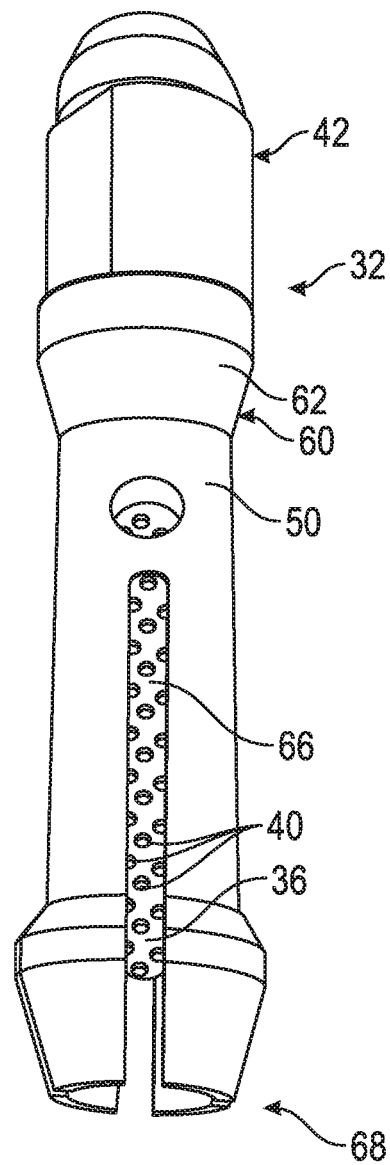
FIG. 7 is an illustration of the filter assembly of FIG. 5 but in assembled form, according to an embodiment of the disclosure.

In some embodiments, the top end 54 may comprise an external threaded region 56 to which the external bushing 42 may be secured. In FIGS. 6 and 7, the two embodiments of FIGS. 4 and 5, respectively, are illustrated with the external bushing 42 threadably secured to the mechanical hold down 50. By way of example, the external bushing 42 may have an internal threaded region 58 which may be threadably engaged with external threaded region 56 to trap strainer bushing 38 between mechanical hold down 50 and external bushing 42. This, in turn, secures the filter section 36 within the protected interior 52 of mechanical hold down 50.

Depending on the parameters of a given application, environment, and/or pump structure, the mechanical hold down 50 may have a variety of configurations. In the illustrated embodiment, for example, the mechanical hold down 50 comprises a tapered section 60 having an external surface 62 oriented to seal against a corresponding surface 64 of the pump housing 26 (see FIG. 1).

The mechanical hold down 50 also may comprise a slot 66 or a plurality of slots 66 position to accommodate flow of the well fluid to the filter section 36. For example, well fluids flowing into the pump 22 are able to readily flow through slots 66 of mechanical hold down 50 and through openings 40 of filter section 36 so as to move into the interior of filter section 36. From the interior of filter section 36, the well fluids are able to flow up through pump 22 as the well fluids are pumped to the surface or to other suitable collection locations. In some embodiments, the mechanical hold down 50 also may comprise a tapered seat member 68 which, in some pump configurations, can be used to seat the pump at its operational, downhole location.

Effectively, the filter assembly 32 provides an improved approach to protecting, handling, and utilizing filters in pumps 22, e.g. in downhole rod lift pumps. The mechanical hold down 50 may be in the form of a hold down mandrel, as described above, which allows the filter assembly to be completed as a single unit. This configuration is beneficial because it reduces the number of moving parts (or potentially moving parts) in the hole while the pump 22 is running and/or while assembling the pump 22. Additionally, the strainer 34 is enclosed and protected. The strainer bushing 38 also provides a mechanism for securing the strainer 34 within mechanical hold down 50 and external bushing 42 without placing undesirable stress on mating parts. As a result, the life of the pump 22 is increased and the pump is less prone to vibrate during operation downhole.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system for use in a well, comprising:
a downhole rod lift pump having a pump housing through which a well fluid is moved during pumping of the well fluid, the pump housing being configured to receive a filter assembly, the filter assembly comprising:
a strainer having a filter section with a plurality of filter openings sized to aid in filtration of solids, and a strainer bushing affixed to the filter section;
a mechanical hold down comprising a main body and a hold-down bushing, the main body having an interior sized to receive the filter section,
wherein, when the hold-down bushing is secured to the main body of the mechanical hold down, the filter section is,
held entirely within the main body between the hold down bushing and the main body once the hold down bushing is threaded onto the main body.

2. The system as recited in claim 1, wherein the filter section is conical in shape.

3. The system as recited in claim 1, wherein the external bushing is threadably engaged with the main body of the mechanical hold down.

4. The system as recited in claim 1, wherein the mechanical hold down comprises slots positioned to accommodate flow of the well fluid to the filter section.

5. The system as recited in claim 1, wherein the mechanical hold down comprises a tapered section having an external surface oriented to seal against a pump seat nipple.

6. The system as recited in claim 1, wherein the mechanical hold down comprises a tapered seat member.

7. A system for use in a well, comprising:
a pump having a pump housing configured to receive a filter assembly, the filter assembly comprising:
a strainer having a filter section and a strainer bushing affixed to the filter section;
a mechanical hold down having a body with an interior sized to receive the filter section and the strainer bushing; and
a bushing secured to the body of the mechanical hold down in a manner that holds the filter section and the strainer bushing with the body of the mechanical hold down,
wherein the filter section has a generally conical shape and includes a plurality of holes sized to filter solids of a predetermined size, and
wherein the body of the mechanical hold down comprises a tapered section having an external surface oriented to seal against the pump housing.

8. The system as recited in claim 7, wherein the pump is a downhole rod lift pump.

9. The system as recited in claim 7, wherein the bushing is threadably engaged with the mechanical hold down body to secure the strainer bushing.

10. A system for use in a well, comprising:
a pump having a pump housing configured to receive a filter assembly, the filter assembly comprising:
a strainer having a filter section and a strainer bushing affixed to the filter section;
a mechanical hold down body having an interior sized to receive the filter section; and
an external bushing secured to the mechanical hold down body in a manner that holds the filter section therein,
wherein the filter section has a generally conical shape and includes a plurality of holes sized to filter solids of a predetermined size, and
wherein the mechanical hold down body comprises slots positioned to accommodate flow of the well fluid to the filter section.

11. The system as recited in claim 10, wherein the pump is a downhole rod lift pump.

12. The system as recited in claim 10, wherein the hold down bushing is threadably engaged with the main body to secure the strainer bushing.

13. A method comprising:
providing a strainer with a filter section and a strainer bushing attached to the filter section, the filter section having a generally conical shape and filter openings sized to filter solids from a fluid flowing through the strainer;
providing a mechanical hold down body with openings positioned to accommodate flow of the fluid to the filter section;
positioning the strainer in a pump housing of a rod lift pump such that the strainer is entirely received within the mechanical hold down body; and
holding the filter section in place in the mechanical hold down body by an external bushing secured to the mechanical hold down body.

14. The method as recited in claim 13, further comprising conveying the rod lift pump downhole into a borehole.

15. The method as recited in claim 14, further comprising operating the rod lift pump to draw the fluid, in the form of well fluid, through the strainer to remove solids.

16. The method as recited in claim 15, further comprising pumping the well fluid to a surface location.

17. The method as recited in claim 13, wherein holding comprises threadably engaging the external bushing with the mechanical hold down body.

\* \* \* \* \*